US011206159B2

(12) United States Patent
Wu et al.

(10) Patent No.: US 11,206,159 B2
(45) Date of Patent: Dec. 21, 2021

(54) SIGNAL EQUALIZATION APPARATUS AND SIGNAL EQUALIZATION METHOD

(71) Applicant: REALTEK SEMICONDUCTOR CORPORATION, Hsinchu (TW)

(72) Inventors: Tsung-En Wu, Taipei (TW); Cheng-Hsien Li, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/088,622

(22) Filed: Nov. 4, 2020

(65) Prior Publication Data
US 2021/0144030 A1 May 13, 2021

(30) Foreign Application Priority Data
Nov. 12, 2019 (TW) ................. 108140936

(51) Int. Cl.
H04L 25/03 (2006.01)
(52) U.S. Cl.
CPC .. *H04L 25/03057* (2013.01); *H04L 25/03006* (2013.01); *H04L 2025/0349* (2013.01); *H04L 2025/03808* (2013.01)
(58) Field of Classification Search
CPC ..... H04L 25/03057; H04L 2025/03808; H04L 2025/0349; H04L 25/03019; H04L 25/03006; H04L 25/03885; H04B 3/32; H04W 52/52
USPC ...................................... 375/233
See application file for complete search history.

(56) References Cited

U.S. PATENT DOCUMENTS

| 5,513,216 | A | 4/1996 | Gadot et al. |
| 5,748,674 | A | 5/1998 | Lim |
| 6,665,337 | B1* | 12/2003 | Girardeau, Jr. ... H04L 25/03019 375/229 |
| 7,151,796 | B2 | 12/2006 | Allpress et al. |
| 7,167,516 | B1 | 1/2007 | He |
| 7,203,256 | B2 | 4/2007 | Lin et al. |
| 7,245,129 | B2* | 7/2007 | Wajcer .................. G01R 31/11 324/527 |
| 7,599,433 | B2 | 10/2009 | Zhu et al. |
| 8,315,301 | B1 | 11/2012 | He |

(Continued)

Primary Examiner — Leila Malek
(74) Attorney, Agent, or Firm — WPAT, PC

(57) ABSTRACT

The present disclosure discloses a signal equalization apparatus. A channel length estimation circuit determines a transmission channel length of the input signal such that a processing circuit retrieves predetermined feed-forward equalizer coefficients. A feed-forward equalizer equalizes the input signal according to operation feed-forward equalizer coefficients. An auto gain circuit amplifies the input signal according to an offset signal. A signal adding circuit adds the amplified input signal and a feedback adjusting signal to generate an added input signal. A data slicer generates a data-slicing result and the offset signal according to reference thresholds based on the added input signal. A feedback equalizer equalizes the data-slicing result to generate the feedback adjusting signal according to operation feedback equalizer coefficients. The feed-forward equalizer and the feedback equalizer keeps updating the equalizer coefficients such that a signal interference noise is eliminated rapidly to increase a signal and noise ratio of the system.

14 Claims, 3 Drawing Sheets

(56) References Cited

U.S. PATENT DOCUMENTS 8,861,573 B2 * 10/2014 Chu ..................... H04L 7/0091
375/219

* cited by examiner

SIGNAL EQUALIZATION APPARATUS AND SIGNAL EQUALIZATION METHOD

BACKGROUND OF THE INVENTION

1. Field of the Invention

The present disclosure relates to a signal equalization apparatus and a signal equalization method.

2. Description of Related Art

In Gigabit Ethernet communication system, a receiver suffers from severe inter-symbol interference (ISI) due to the frequency selective effect of the twisted pair channel that results in the decreasing of the signal-to-noise ratio of the system. Therefore, an equalizer is usually disposed in the receiver to eliminate the inter-symbol interference.

During the connection startup procedure, the frequency selective effect may be too strong for the equalizer to converge. In addition, the coefficients of the equalizer may need to wait for a long time to reach their final values. However, in current technology, it is important for the equalizer to converge properly and efficiently under the limited timing budget, or the device can not establish a stable connection with its link partner. The interaction among the feed-forward and feedback equalizer, the echo canceller, and the timing recovery module during the convergence of the equalizer may result in an even longer convergence time or simply make the convergence of the inner-receiver system impossible. The establishment of the connection thus becomes out of reach.

SUMMARY OF THE INVENTION

In consideration of the problem of the prior art, an object of the present disclosure is to provide a signal equalization apparatus and a signal equalization method to provide quick and effective convergence of the operation feed-forward equalizer coefficients of the feed-forward equalizer to reduce the inter-symbol interference and to increase the signal-to-noise ratio of the Gigabit Ethernet communication system.

The present disclosure discloses a signal equalization apparatus that includes a channel length estimation circuit, a processing circuit, a feed-forward equalizer, an auto gain control circuit, a signal adding circuit, a data slicer and a feedback equalizer. The channel length estimation circuit is configured to receive an input signal and further determine a transmission channel length that the input signal is transmitted according to a frequency response intensity ratio of the input signal among selected frequencies. The processing circuit is configured to retrieve a corresponding group of predetermined feed-forward equalizer coefficients from a pre-stored reference data according to the transmission channel length, wherein the pre-stored reference data is configured to store corresponding relations between a plurality of channel lengths and a plurality groups of feed-forward equalizer coefficients. The feed-forward equalizer is configured to perform equalization on the input signal according to a group of operation feed-forward equalizer coefficients to generate an equalized input signal. The auto gain control circuit is configured to adjust a gain according to an offset signal and amplify the equalized input signal according to the gain to generate an amplified input signal. The signal adding circuit is configured to add the amplified input signal and a feedback adjusting signal to generate an added input signal. The data slicer is configured to perform data-slicing based on the added input signal according to a plurality of reference thresholds to generate a data-slicing result and the offset signal relative to the reference thresholds. The feedback equalizer is configured to perform equalization on the data-slicing result to generate the feedback adjusting signal according to a group of operation feedback equalizer coefficients. The processing circuit is configured to set the group of predetermined feed-forward equalizer coefficients as the group of operation feed-forward equalizer coefficients of the feed-forward equalizer to initialize the equalization performed on the input signal, and the feed-forward equalizer keeps updating the group of operation feed-forward equalizer coefficients according to the input signal and the offset signal and the feedback equalizer keeps updating the group of operation feedback equalizer coefficients according to the data-slicing result and the offset signal.

The present disclosure also discloses a signal equalization method used in a signal equalization apparatus that includes the steps outlined below. An input signal is received and a transmission channel length that the input signal is transmitted is further determined according to a frequency response intensity ratio of the input signal among selected frequencies by a channel length estimation circuit. A corresponding group of predetermined feed-forward equalizer coefficients are retrieved from a pre-stored reference data by a processing circuit according to the transmission channel length, wherein the pre-stored reference data is configured to store corresponding relations between a plurality of channel lengths and a plurality groups of feed-forward equalizer coefficients. Equalization on the input signal is performed by a feed-forward equalizer according to a group of operation feed-forward equalizer coefficients to generate an equalized input signal. A gain is adjusted according to an offset signal and the equalized input signal is amplified according to the gain to generate an amplified input signal by an auto gain control circuit. The amplified input signal and a feedback adjusting signal are added to generate an added input signal by a signal adding circuit. Data-slicing is performed based on the added input signal by a data slicer according to a plurality of reference thresholds to generate a data-slicing result and the offset signal relative to the reference thresholds. Further equalization is performed on the data-slicing result by a feedback equalizer to generate the feedback adjusting signal according to a group of operation feedback equalizer coefficients. The group of predetermined feed-forward equalizer coefficients are set as the group of operation feed-forward equalizer coefficients of the feed-forward equalizer by the processing circuit to initialize the equalization performed on the input signal. The group of operation feed-forward equalizer coefficients are kept updating by the feed-forward equalizer according to the input signal and the offset signal. The group of operation feedback equalizer coefficients are kept updating by the feedback equalizer according to the data-slicing result and the offset signal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a signal equalization apparatus and a signal equalization method to rapidly converge the operation feed-forward equalizer coefficients of the feed-forward equalizer to quickly and efficiently lower the inter-symbol interference of the received signals.

Figure 1:
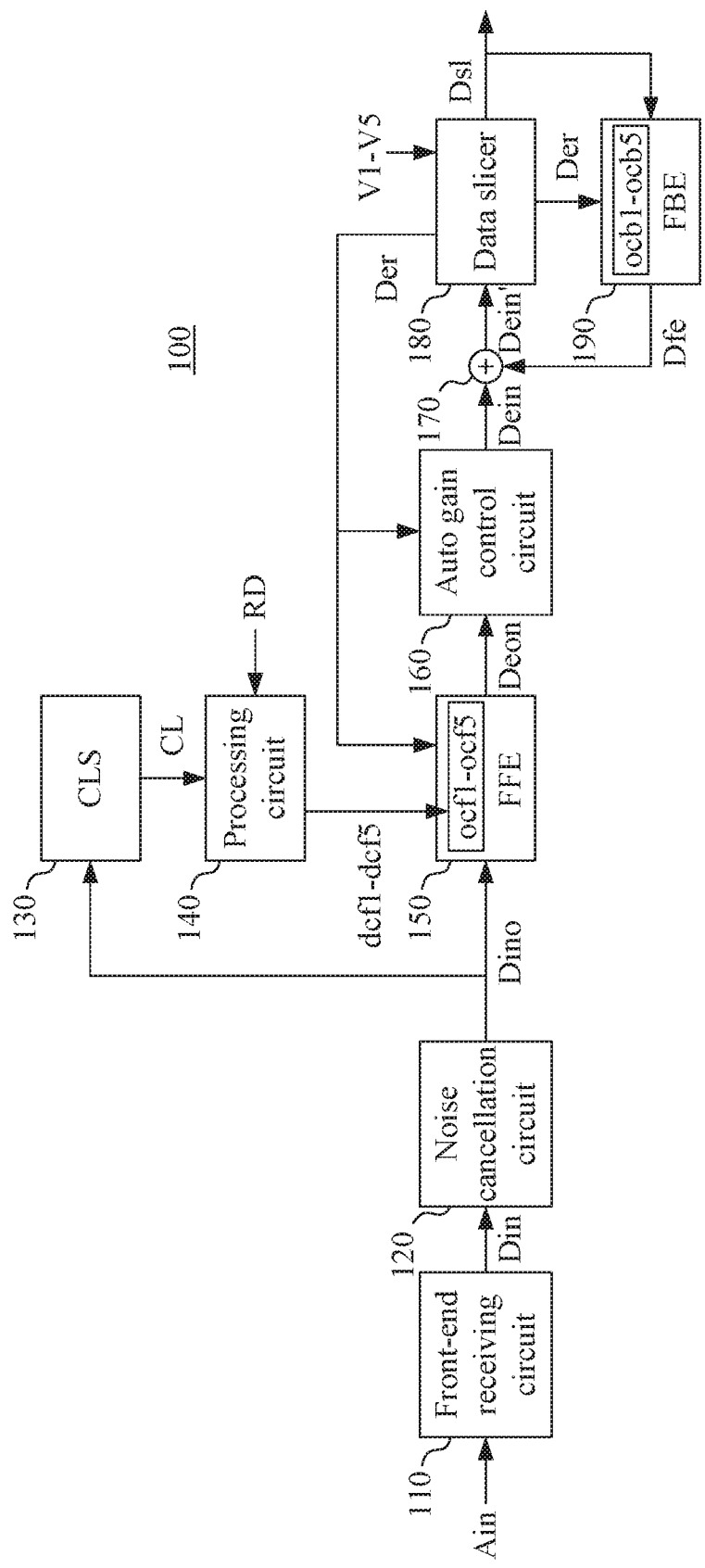
FIG. 1 illustrates a block diagram of a signal equalization apparatus according to an embodiment of the present invention.

FIG. 1 illustrates a block diagram of a signal equalization apparatus 100 according to an embodiment of the present invention. In an embodiment, the signal equalization apparatus 100 is disposed in such as, but not limited to a receiver of a Gigabit Ethernet communication system to perform equalization on a received signal. More specifically, the signal equalization apparatus 100 eliminates pre-cursors and/or post-cursors of the signal transmitted through a channel having a frequency selective effect to suppress the inter-symbol interference on received signals and thus increase the signal-to-noise ratio.

The signal equalization apparatus 100 includes a front-end receiving circuit 110, a noise cancellation circuit 120, a channel length estimation circuit 130 (abbreviated as CLS in FIG. 1), a processing circuit 140, a feed-forward equalizer 150 (abbreviated as FFE in FIG. 1), an auto gain control circuit 160, a signal adding circuit 170, a data slicer 180 and a feedback equalizer 190 (abbreviated as FBE in FIG. 1).

The front-end receiving circuit 110 is configured to receive a front-end input signal Ain having an analog form to perform an analog signal processing procedure and an analog-to-digital conversion on the front-end input signal Ain to generate an input signal Din having a digital form. In an embodiment, the analog signal processing procedure may include such as, but not limited to filtering, gain amplification during the analog signal processing stage.

Subsequently, the noise cancellation circuit 120 is configured to perform echo and crosstalk noise cancellation on the input signal Din from the front-end receiving circuit 110 such that the channel length estimation circuit 130 receives the input signal Dino having the echo and crosstalk noise cancellation performed.

The channel length estimation circuit 130 is configured to receive the input signal Dino and further determine a transmission channel length CL that the input signal Dino is transmitted according to a frequency response intensity ratio of the input signal Dino among selected frequencies. More specifically, in an embodiment, the Gigabit Ethernet communication system assumes that the signal is transmitted through twisted pair cables that comply with CAT5 or CAT5e standards. Based on the characteristic that CAT5 or CAT5e cables vary its frequency response according its length, the channel length estimation circuit 130 can generate the intensity of the first frequency and the second frequency of the input signal Dino by using such as, but not limited to discrete Fourier Transform. According to the intensity ratio of the two selected frequencies, the transmission channel length CL that the input signal Dino is transmitted through can be calculated.

The processing circuit 140 is further configured to retrieve a corresponding group of predetermined feed-forward equalizer coefficients dcf1-dcf5 from a pre-stored reference data RD according to the estimation of transmission channel length CL.

In an embodiment, the pre-stored reference data RD can be stored in such as, but not limited to a storage circuit (not illustrated) included in the signal equalization apparatus 100. The pre-stored reference data RD is configured to store corresponding relations between a plurality of channel lengths and a plurality groups of feed-forward equalizer coefficients. By using the corresponding relations, the processing circuit 140 can retrieve the corresponding group of predetermined feed-forward equalizer coefficients dcf1-dcf5 according to the transmission channel length CL determined by the channel length estimation circuit 130.

The feed-forward equalizer 150 is configured to perform equalization on the input signal Dino according to a group of operation feed-forward equalizer coefficients ocf1-ocf5 to eliminate the pre-cursors of the input signal Dino. In an embodiment, the processing circuit 140 is configured to set the group of predetermined feed-forward equalizer coefficients dcf1-dcf5 as the group of operation feed-forward equalizer coefficients ocf1-ocf5 of the feed-forward equalizer 150 to initialize the equalization performed on the input signal Dino to generate an equalized input signal Deon.

Figure 2:
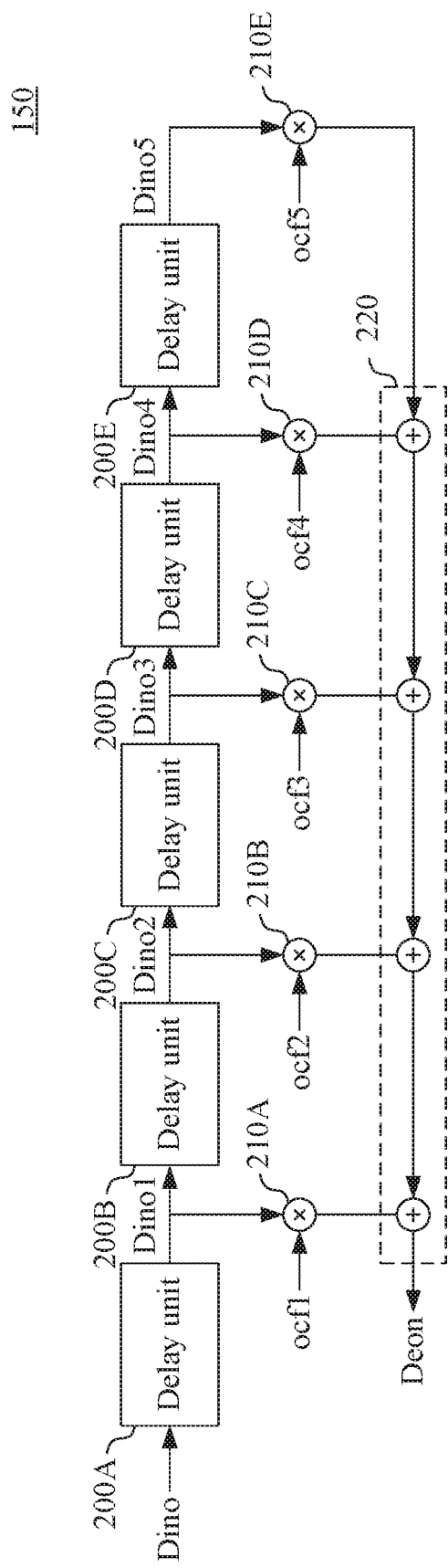
FIG. 2 illustrates a block diagram of the feed-forward equalizer according to an embodiment of the present invention.

Reference is now made to FIG. 2. FIG. 2 illustrates a block diagram of the feed-forward equalizer 150 according to an embodiment of the present invention. The feed-forward equalizer 150 includes delay units 200A-200E, multipliers 210A-210E and adder 220.

In an embodiment, the delay units 200A-200E are connected in series to respectively perform delay on the input signal Dino to generate delayed input signals Dino1-Dino5.

The multipliers 210A-210E are disposed correspondingly to the delay units 200A-200E and are configured to multiply the delayed input signals Dino1-Dino5 by the operation feed-forward equalizer coefficients ocf1-ocf5 respectively.

Subsequently, the adder 220 adds the multiplication results from the multipliers 210A-210E to generate the equalized input signal Deon. More specifically, the equalized input signal Deon can be expressed by the following equation:

$$Deon=Dino1 \times ocf1+Dino2 \times ocf2+Dino3 \times ocf3+Dino4 \times ocf4+Dino5 \times ocf5 \quad \text{(equation 1)}$$

It is appreciated that the configuration of the feed-forward equalizer 150, the number of each of the components therein and the number of the coefficients included in the group of the operation feed-forward equalizer coefficients described above are merely an example. In other embodiments, the feed-forward equalizer 150 can be implemented by other configurations, and the numbers of the component therein and the coefficients can be other values.

The auto gain control circuit 160 is configured to adjust a gain according to the equalized input signal Deon and an offset signal Der and amplify the equalized input signal Deon according to the gain to generate an amplified input signal Dein. Further, the signal adding circuit 170 is configured to add the amplified input signal Dein and a feedback adjusting signal Dfe to generate an added input signal Dein'.

The data slicer 180 is configured to receive and perform data-slicing based on the added input signal Dein' according to a plurality of reference thresholds to generate a data-slicing result Dsl and the offset signal Der relative to the reference thresholds.

In an embodiment, the data slicer 180 compares the added input signal Dein' with the reference thresholds to determine a closest reference threshold among the reference thresholds that is closest to the added input signal Dein'. Further, the data slicer 180 sets the closest reference threshold as the data-slicing result Dsl. The data slicer 180 transmits the data-slicing result Dsl to a next stage of circuit of the signal equalization apparatus 100. Moreover, the data slicer 180 sets a difference between the added input signal Dein' and the closest reference threshold as the offset signal Der.

For example, the number of the reference thresholds can be five and these reference thresholds can be V1-V5 respectively. After the data slicer 180 performs comparison, the data slicer 180 determines that the added input signal Dein' is closest to the reference threshold V5. As a result, the data slicer 180 sets the reference threshold V5 as the data-slicing result Dsl and sets the difference between the added input signal Dein' and the reference threshold V5 as the offset signal Der.

It is appreciated that the number of the reference thresholds is merely an example. In other embodiments, the number of the reference thresholds can be other values.

The feedback equalizer 190 is configured to perform equalization on the data-slicing result Dsl to generate the feedback adjusting signal Dfe according to a group of operation feedback equalizer coefficients ocb1-ocb5, such that the signal adding circuit 170 adds the amplified input signal Dein and the feedback adjusting signal Dfe as described above to eliminate the post-cursors of the input signal Dein. In an embodiment, the configuration and operation of the feedback equalizer 190 are identical to those of the feed-forward equalizer 150. The detail is thus not described herein.

In an embodiment, the offset signal Der generated by the data slicer 180 is not only fed to the auto gain control circuit 160 to adjust the gain, but also fed to the feed-forward equalizer 150 and the feedback equalizer 190 such that the feed-forward equalizer 150 and the feedback equalizer 190 respectively update the operation feed-forward equalizer coefficients ocf1-ocf5 and the operation feedback equalizer coefficients ocb1-ocb5 according to the offset signal Der.

Take the feed-forward equalizer 150 as an example, after initializing the equalization performed on the input signal Dino according to the group of predetermined feed-forward equalizer coefficients dcf1-dcf5, the feed-forward equalizer 150 keeps updating the operation feed-forward equalizer coefficients ocf1-ocf5 by calculation with the input signal Dino and the offset signal Der during operation.

In an embodiment, the feed-forward equalizer 150 updates the group of operation feed-forward equalizer coefficients ocf1-ocf5 according to a least mean square method and performs calculation by using the following equation:

$$ocf_{m,n} = ocf_{m,n-1} + u \times x_{n-1} \times e_{n-1} \quad \text{(equation 2)}$$

It is appreciated that $ocf_{m,n}$ is the m-th operation feed-forward equalizer coefficient at the n-th time spot, $ocf_{m,n-1}$ is the m-th operation feed-forward equalizer coefficient at the n−1-th time spot and u is an adjustable step size to determine the speed of adjustment performed on the operation feed-forward equalizer coefficients by using the equation 2. When u is larger, the degree of each adjustment is larger. $x_{n-1}$ is the amount of the input signal Dino. $e_{n-1}$ is the amount of the offset signal Der.

As a result, the feed-forward equalizer 150 can adjust each of the operation feed-forward equalizer coefficients ocf1-ocf5 according to the condition of the input signal Dino in real time by using the method described above such that the signal equalization apparatus 100 can eliminate the pre-cursors of the input signal more accurately.

Identically, the feedback equalizer 190 can update the group of operation feedback equalizer coefficients ocb1-ocb5 according to the least mean square method described above by calculation with the data-slicing result Dsl and the offset signal Der during operation.

The establishment of the pre-stored reference data RD is described in further detail in the following paragraphs.

The pre-stored reference data RD can be established by measuring the frequency responses of the transmission channels of different lengths under offline status and performing corresponding calculation.

In an example, the groups of feed-forward equalizer coefficients each corresponding to different transmission channel lengths can be generated by performing calculation based on a plurality of measured channel responses and a desired response result. For example, the relation of a measured channel response corresponding to a transmission channel length, a group of feed-forward equalizer coefficients and a desired response result is expressed by the following equation:

$$\begin{bmatrix} r0 & 0 & 0 & 0 & 0 \\ r1 & r0 & 0 & 0 & 0 \\ r3 & r2 & r0 & 0 & 0 \\ r3 & r2 & r1 & r0 & 0 \\ r4 & r3 & r2 & r1 & r0 \end{bmatrix} \begin{bmatrix} cf1 \\ cf2 \\ cf3 \\ cf4 \\ cf5 \end{bmatrix} = \begin{bmatrix} 0 \\ 0 \\ 0 \\ 1 \\ 0 \end{bmatrix} \quad \text{(equation 3)}$$

For the matrix of the left side of the equation 3, the five rows represent the input signal at five consecutive time spots. The five entries in each of the five rows represent such as, but not limited to the delayed input signal Dino1-Dino5 illustrated in FIG. 2. For example, the first row corresponds to the first time spot and the values of the delayed input signal Dino1-Dino5 are r0, 0, 0, 0 and 0. The second row corresponds to the second time spot and the values of the delayed input signal Dino1-Dino5 are r1, r0, 0, 0 and 0, so on and so forth.

The one-dimensional vector of the left side of the equation 3 is a group of unknown feed-forward equalizer coefficients cf1-cf5. The one-dimensional vector of right side of the equation 3 is a desired equalized result and can be disposed depending on practical requirements. In the equation 3 of the present embodiment, the fourth entry is desired to have the largest response intensity.

As a result, according to equation 3, the multiplication of each row of measured channel responses and the unknown feed-forward equalizer coefficients cf1-cf5 generates the desired equalized result. Therefore, under the condition that the input signal and the desired equalized result are known, the feed-forward equalizer coefficients cf1-cf5 can be calculated iteratively. After a multiple times of measurements of input signal corresponding to different transmission channel lengths and the calculation of equation 3, a multiple groups of feed-forward equalizer coefficients cf1-cf5 can be obtained and stored in the pre-stored reference data RD so to be retrieved by the processing circuit 140 as the group of predetermined feed-forward equalizer coefficients dcf1-dcf5.

In an embodiment, the pre-stored reference data RD stores the corresponding relations of the channel length and the feed-forward equalizer coefficients cf1-cf5 in the form of a lookup table or a curve.

When the pre-stored reference data RD is implemented by using the lookup table, discrete information is stored therein. The processing circuit 140 can look up such table by using one of the channel lengths in the pre-stored reference data RD closest to the estimated transmission channel length CL to retrieve a group of predetermined feed-forward equalizer coefficients dcf1-dcf5.

When the pre-stored reference data RD is implemented by using the curve, continuous information is stored therein. In an embodiment, different predetermined feed-forward equalizer coefficients dcf1-dcf5 may have different corresponding curves such that the processing circuit 140 searches each of the predetermined feed-forward equalizer coefficients dcf1-dcf5 on the respective curves according to the estimated transmission channel length CL. The curves can be constructed by linearizing the discrete information.

As a result, the signal equalization apparatus 100 of the present invention can determine the transmission channel length CL quickly according to the input signal Dino by using the channel length estimation circuit 130 such that the processing circuit 140 retrieves a group of predetermined feed-forward equalizer coefficients dcf1-dcf5 from a pre-stored reference data RD according to the transmission channel length CL to allow the feed-forward equalizer 150 using the group of predetermined feed-forward equalizer coefficients dcf1-dcf5 as the group of operation feed-forward equalizer coefficients ocf1-ocf5 of the feed-forward equalizer 150 to initialize the equalization performed on the input signal Dino to generate an equalized input signal Deon. The operation feed-forward equalizer coefficients ocf1-ocf5 are further updated along with the operation of the signal equalization apparatus 100.

By using such a design, the operation feed-forward equalizer coefficients ocf1-ocf5 can be converged quickly and efficiently to reduce the inter-symbol interference of the received signals. The connection with the link partner can be established and the condition that the signal stays unstable for a long time due to the slow convergence causing low signal-to-noise ratio can be avoided.

It is appreciated that the configuration of the signal equalization apparatus 100 illustrated in FIG. 1 is merely an example. In other embodiments, part of the circuit components, e.g. the front-end receiving circuit 110, the noise cancellation circuit 120, the auto gain control circuit 160, the signal adding circuit 170 and the feedback equalizer 190, can be selectively disposed or removed under the condition that the operation of the feed-forward equalizer 150 is not affected.

Figure 3:
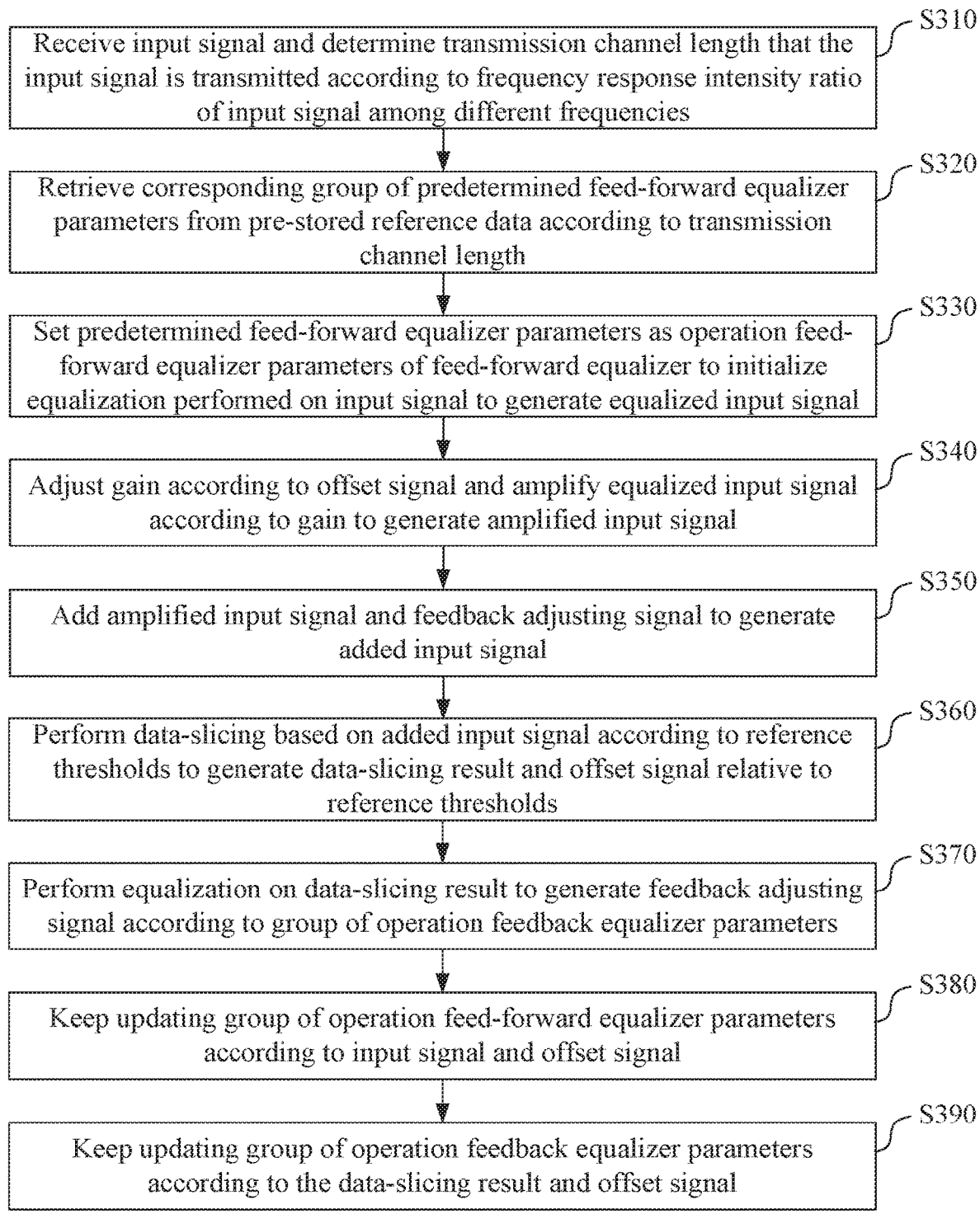
FIG. 3 is a flow chart of a signal equalization method according to an embodiment of the present invention.

Reference is now made to FIG. 3. FIG. 3 is a flow chart of a signal equalization method 300 according to an embodiment of the present invention.

Besides the apparatus described above, the present invention further provides the signal equalization method 300 that can be used in such as, but not limited to the signal equalization apparatus 100 in FIG. 1. As illustrated in FIG. 3, an embodiment of the signal equalization method 300 includes the following steps.

In step S310, the input signal Dino is received and the transmission channel length CL that the input signal Dino is transmitted is further determined according to the frequency response intensity ratio of the input signal Dino among selected frequencies by the channel length estimation circuit 130.

In step S320, the corresponding group of predetermined feed-forward equalizer coefficients dcf1-dcf5 are retrieved from the pre-stored reference data RD by the processing circuit 140 according to the transmission channel length CL, wherein the pre-stored reference data RD is configured to store corresponding relations between a plurality of channel lengths and a plurality groups of feed-forward equalizer coefficients.

In step S330, the group of predetermined feed-forward equalizer coefficients dcf1-dcf5 are set as the group of operation feed-forward equalizer coefficients ocf1-ocf5 of the feed-forward equalizer 150 to initialize the equalization performed on the input signal Dino to generate an equalized input signal Deon.

In step S340, the gain is adjusted according to the offset signal Der and the equalized input signal Deon is amplified according to the gain to generate the amplified input signal Dein by the auto gain control circuit 160.

In step S350, the amplified input signal Dein and the feedback adjusting signal Dfe are added to generate the added input signal Dein' by the signal adding circuit 170 such that the data slicer 180 receives the added input signal Dein'.

In step S360, data-slicing is performed based on the added input signal Dein' by the data slicer 180 according to the plurality of reference thresholds V1-V5 to generate the data-slicing result Dsl and the offset signal Der relative to the reference thresholds V1-V5.

In step S370, equalization is performed on the data-slicing result Dsl by the feedback equalizer 190 to generate the feedback adjusting signal Dfe according to the group of operation feedback equalizer coefficients ocb1-ocb5.

In step S380, the group of operation feed-forward equalizer coefficients ocf1-ocf5 are kept updating by the feed-forward equalizer 150 according to the input signal Dino and the offset signal Der.

In step S390, the group of operation feedback equalizer coefficients ocb1-ocb5 are kept updating by the feedback equalizer 190 according to the data-slicing result Dsl and the offset signal Der.

It is appreciated that the embodiments described above are merely an example. In other embodiments, it should be appreciated that many modifications and changes may be made by those of ordinary skill in the art without departing from the spirit of the invention.

In summary, the signal equalization apparatus and the signal equalization method of the present invention can converge the operation feed-forward equalizer coefficients of the feed-forward equalizer much more quickly and efficiently to reduce the inter-symbol interference of received signals and to increase the signal-to-noise ratio.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A signal equalization apparatus, comprising:
    a channel length estimation circuit configured to receive an input signal and further determine a transmission channel length that the input signal is transmitted according to a frequency response intensity ratio of the input signal among selected frequencies;
    a processing circuit configured to retrieve a corresponding group of predetermined feed-forward equalizer coefficients from a pre-stored reference data according to the transmission channel length, wherein the pre-stored reference data is configured to store corresponding relations between a plurality of channel lengths and a plurality groups of feed-forward equalizer coefficients;

a feed-forward equalizer configured to perform equalization on the input signal according to a group of operation feed-forward equalizer coefficients to generate an equalized input signal;

an auto gain control circuit configured to adjust a gain according to an offset signal and amplify the equalized input signal according to the gain to generate an amplified input signal;

a signal adding circuit configured to add the amplified input signal and a feedback adjusting signal to generate an added input signal;

a data slicer configured to perform data-slicing based on the added input signal according to a plurality of reference thresholds to generate a data-slicing result and the offset signal relative to the reference thresholds; and a feedback equalizer configured to perform equalization on the data-slicing result to generate the feedback adjusting signal according to a group of operation feedback equalizer coefficients;

wherein the processing circuit is configured to set the group of predetermined feed-forward equalizer coefficients as the group of operation feed-forward equalizer coefficients of the feed-forward equalizer to initialize the equalization performed on the input signal, and the feed-forward equalizer keeps updating the group of operation feed-forward equalizer coefficients according to the input signal and the offset signal and the feedback equalizer keeps updating the group of operation feedback equalizer coefficients according to the data-slicing result and the offset signal.

2. The signal equalization apparatus of claim 1, further comprising:

a front-end receiving circuit configured to receive a front-end input signal having an analog form to perform an analog signal processing procedure and an analog-to-digital conversion on the front-end input signal to generate the input signal having a digital form; and a noise cancellation circuit configured to perform echo and crosstalk noise cancellation on the input signal from the front-end receiving circuit having the digital form such that the channel length estimation circuit and the feed-forward equalizer receive the input signal having the echo and crosstalk noise cancellation performed.

3. The signal equalization apparatus of claim 1, wherein the pre-stored reference data stores the corresponding relations in the form of a lookup table or a curve.

4. The signal equalization apparatus of claim 1, wherein the group of predetermined feed-forward equalizer coefficients are generated by performing calculation based on a plurality of measured channel responses under the transmission channel length and a desired response result.

5. The signal equalization apparatus of claim 1, wherein the group of predetermined feed-forward equalizer coefficients are generated by performing calculation based on a relation equation of a plurality of measured channel responses under the transmission channel length and a desired response result.

6. The signal equalization apparatus of claim 1, wherein the feed-forward equalizer and the feedback equalizer are configured to update the group of operation feed-forward equalizer coefficients and the group of operation feedback equalizer coefficients according to a least mean square method.

7. The signal equalization apparatus of claim 1, wherein the data slicer sets a closest reference threshold among the reference thresholds that is closest to the added input signal as the data-slicing result and sets a difference between the added input signal and the closest reference threshold as the offset signal.

8. A signal equalization method used in a signal equalization apparatus, comprising:

receiving an input signal and further determining a transmission channel length that the input signal is transmitted according to a frequency response intensity ratio of the input signal among selected frequencies by a channel length estimation circuit;

retrieving a corresponding group of predetermined feed-forward equalizer coefficients from a pre-stored reference data by a processing circuit according to the transmission channel length, wherein the pre-stored reference data is configured to store corresponding relations between a plurality of channel lengths and a plurality groups of feed-forward equalizer coefficients;

performing equalization on the input signal by a feed-forward equalizer according to a group of operation feed-forward equalizer coefficients to generate an equalized input signal;

adjusting a gain according to an offset signal and amplifying the equalized input signal according to the gain to generate an amplified input signal by an auto gain control circuit;

adding the amplified input signal and a feedback adjusting signal to generate an added input signal by a signal adding circuit;

performing data-slicing based on the added input signal by a data slicer according to a plurality of reference thresholds to generate a data-slicing result and the offset signal relative to the reference thresholds; and performing equalization on the data-slicing result by a feedback equalizer to generate the feedback adjusting signal according to a group of operation feedback equalizer coefficients;

setting the group of predetermined feed-forward equalizer coefficients as the group of operation feed-forward equalizer coefficients of the feed-forward equalizer by the processing circuit to initialize the equalization performed on the input signal and keeping updating the group of operation feed-forward equalizer coefficients by the feed-forward equalizer according to the input signal and the offset signal; and keeping updating the group of operation feedback equalizer coefficients by the feedback equalizer according to the data-slicing result and the offset signal.

9. The signal equalization method of claim 8, further comprising:

receiving a front-end input signal having an analog form by a front-end receiving circuit to perform an analog signal processing procedure and an analog-to-digital conversion on the front-end input signal to generate the input signal having a digital form; and performing echo and crosstalk noise cancellation on the input signal from the front-end receiving circuit having the digital form by a noise cancellation circuit such that the channel length estimation circuit and the feed-forward equalizer receive the input signal having the echo and crosstalk noise cancellation performed.

10. The signal equalization method of claim 8, wherein the pre-stored reference data stores the corresponding relations in the form of a lookup table or a curve.

11. The signal equalization method of claim 8, wherein the group of predetermined feed-forward equalizer coefficients are generated by performing calculation based on a plurality of measured channel responses under the transmission channel length and a desired response result.

12. The signal equalization method of claim 8, wherein the group of predetermined feed-forward equalizer coefficients are generated by performing calculation based on a relation equation of a plurality of measured channel responses under the transmission channel length and a desired response result.

13. The signal equalization method of claim 8, further comprising:
   updating the group of operation feed-forward equalizer coefficients and the group of operation feedback equalizer coefficients according to a least square method by the feed-forward equalizer and the feedback equalizer.

14. The signal equalization method of claim 8, further comprising:
   setting a closest reference threshold among the reference thresholds that is closest to the added input signal as the data-slicing result and setting a difference between the added input signal and the closest reference threshold as the offset signal by the data slicer.

* * * * *